United States Patent
Xie et al.

(10) Patent No.: US 11,163,474 B2
(45) Date of Patent: *Nov. 2, 2021

(54) MIGRATION OF DATA FROM A STORAGE CONTROLLER TO CLOUD STORAGE BY USING PARALLEL READERS FOR THE DATA

(71) Applicant: INTERNATIONAL BUSINESS MACHINES CORPORATION, Armonk, NY (US)

(72) Inventors: Qiang Xie, Shanghai (CN); Hui Zhang, Shanghai (CN); Edward H. Lin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 16 days.

This patent is subject to a terminal disclaimer.

(21) Appl. No.: 16/280,980

(22) Filed: Feb. 20, 2019

(65) Prior Publication Data

US 2020/0264798 A1 Aug. 20, 2020

(51) Int. Cl.
*G06F 3/06* (2006.01)

(52) U.S. Cl.
CPC .......... *G06F 3/0647* (2013.01); *G06F 3/0604* (2013.01); *G06F 3/067* (2013.01); *G06F 3/0659* (2013.01)

(58) Field of Classification Search
CPC .... G06F 3/0647; G06F 3/0604; G06F 3/0659; G06F 3/067; G06F 3/06
See application file for complete search history.

(56) References Cited

U.S. PATENT DOCUMENTS

| | | | |
|---|---|---|---|
| 7,685,129 B1 | 3/2010 | LeCrone et al. | |
| 8,650,159 B1* | 2/2014 | Zhang | G06F 11/1448 707/664 |
| 8,788,628 B1* | 7/2014 | Taylor | G06F 16/172 709/219 |
| 9,503,542 B1 | 11/2016 | Wang et al. | |
| 9,588,977 B1 | 3/2017 | Wang et al. | |
| 9,769,030 B1 | 9/2017 | Ramalingam et al. | |

(Continued)

OTHER PUBLICATIONS

"Apparatus and Method for Online Data Migration with Enhanced Multipath Driver", dated May 13, 2011, an IP.com Prior Art Database Technical Disclosure, Total 18 pages.

(Continued)

*Primary Examiner* — Tuan V Thai
(74) *Attorney, Agent, or Firm* — Konrad, Raynes, Davda and Victor LLP; Rabindranath Dutta

(57) ABSTRACT

Provided are a method, system, and computer program product in which a storage controller receives a request from a host to migrate a source dataset comprising a plurality of tracks to a cloud storage. A plurality of readers are initiated to read the plurality of tracks of the source dataset in parallel, wherein each of the plurality of readers reads different tracks from the source dataset and transmits the tracks that are read from the source dataset to a migrator. For each track received by the migrator from the plurality of readers, the track is appended sequentially to a migrate dataset to be stored in the cloud storage. Metadata that indicates a mapping of tracks of the source dataset to tracks of the migrate dataset is generated.

20 Claims, 10 Drawing Sheets

(56) References Cited

U.S. PATENT DOCUMENTS

| | | | |
|---|---|---|---|
| 2012/0233293 A1* | 9/2012 | Barton | H04L 67/06 |
| | | | 709/219 |
| 2013/0166727 A1* | 6/2013 | Wright | G06F 3/0659 |
| | | | 709/224 |
| 2016/0100007 A1 | 4/2016 | Prahlad et al. | |
| 2016/0154738 A1* | 6/2016 | Gaertner | G06F 12/0871 |
| | | | 711/113 |
| 2017/0230476 A1 | 8/2017 | Dow et al. | |
| 2017/0322885 A1 | 11/2017 | Mukherjee et al. | |
| 2017/0357645 A1 | 12/2017 | Kritchko et al. | |
| 2018/0032283 A1* | 2/2018 | Park | G06F 3/0656 |
| 2019/0294376 A1* | 9/2019 | Park | G06F 3/064 |

OTHER PUBLICATIONS

U.S. Appl. No. 16/280,986, filed Feb. 20, 2019, Total 34 pages.
List of IBM Patents or Patent Applications Treated as Related, Feb. 20, 2019, Total 2 pp.
U.S. Appl. No. 15/695,832, filed Sep. 5, 2017, Total 34 pages.
Office Action, dated Feb. 13, 2020, for U.S. Appl. No. 16/280,986, filed Feb. 20, 2019, Total 27 pages.
Response to Office Action, dated May 13, 2020, for U.S. Appl. No. 16/280,986, filed Feb. 20, 2019, Total 9 pages.
Final Office Action, dated Jun. 23, 2020, for U.S. Appl. No. 16/280,986, filed Feb. 20, 2019, Total 23 pages.
Notice of Allowance, dated Jul. 22, 2021, for U.S. Appl. No. 16/280,986, filed Feb. 20, 2019, Total 16 pages.

* cited by examiner

MIGRATION OF DATA FROM A STORAGE CONTROLLER TO CLOUD STORAGE BY USING PARALLEL READERS FOR THE DATA

BACKGROUND

1. Field

Embodiments relate to the migration of data from a storage controller to cloud storage by using parallel readers for the data.

2. Background

Cloud storage is a model of data storage in which digital data is stored in logical pools, and the physical storage spans a plurality of servers. The physical storage environment may be owned and managed by a hosting company referred to as a cloud storage provider. These cloud storage providers may be responsible for keeping the data available and accessible, and for keeping the physical environment protected and maintained properly. People and organizations may buy or lease storage capacity from the cloud storage providers to store user, organization, or application data.

In certain storage system environments, a storage controller may comprise a plurality of storage servers that are coupled to each other, where one or more of the storage servers may comprise a plurality of processing nodes or servers. The storage controller allows host computing systems to perform input/output (I/O) operations with a plurality of storage devices controlled by the storage controller.

A storage management application that executes in the storage controller may manage the plurality of storage devices, where the plurality of storage devices may comprise disk drives, tape drives, flash drives, direct access storage devices (DASD), etc. A host computational device may send Input/Output (I/O) commands to the storage controller and the storage controller may execute the I/O commands to read data from the storage devices or write data to the storage devices. In certain situations, the storage controller may also store and maintain certain data in a cloud storage, in addition to storing data in the plurality of storage devices controlled by the storage controller.

SUMMARY OF THE PREFERRED EMBODIMENTS

Provided are a method, system, and computer program product in which a storage controller receives a request from a host to migrate a source dataset comprising a plurality of tracks to a cloud storage. A plurality of readers are initiated to read the plurality of tracks of the source dataset in parallel, wherein each of the plurality of readers reads different tracks from the source dataset and transmits the tracks that are read from the source dataset to a migrator. For each track received by the migrator from the plurality of readers, the track is appended sequentially to a migrate dataset to be stored in the cloud storage. Metadata that indicates a mapping of tracks of the source dataset to tracks of the migrate dataset is generated.

In additional embodiments, the storage controller stores the migrate dataset in the cloud storage as a cloud object.

In yet additional embodiments, the storage controller receives a request from the host to generate the source dataset by downloading the cloud object from the cloud storage. A determination is made by a plurality of writers that execute in parallel, from the metadata, which track of the migrate dataset of the cloud object corresponds to which track of the source dataset to generate the source dataset from the migrate dataset.

In further embodiments, the tracks of the source dataset are ordered differently in the migrate dataset.

In yet further embodiments, the metadata indicates for each track of the migrate dataset a corresponding track of the source dataset.

In certain embodiments, the plurality of readers that read the tracks of the source dataset in parallel increases a speed of reading from storage drives in comparison to reading all tracks of the source dataset sequentially by a single reader.

In further embodiments, the migrate dataset is stored as a single object in the cloud storage.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain embodiments improve the performance of a storage controller that migrates datasets to a cloud storage from storage drives, and then at a later point in time recalls the data from the cloud storage to the storage drives. The improvement in performance takes place by performing the reading of tracks from storage drives via a plurality of reader threads that execute in parallel, and by performing the writing of tracks to storage drives via a plurality of writer threads that execute in parallel. In view of the parallel reading of tracks from storage drives, the order of tracks in a dataset migrated to the cloud storage may be different from the order of tracks for the same dataset in the storage drives. A metadata that maps the order of tracks of a dataset in the storage drives to the migrated dataset in the cloud storage is generated while migrating the dataset to the cloud storage. When the dataset is recalled from the cloud storage to the storage drives, the metadata is used to order the tracks of the recalled dataset in the original order of storage of tracks of the dataset in the storage drives.

Exemplary Embodiments

Figure 1:
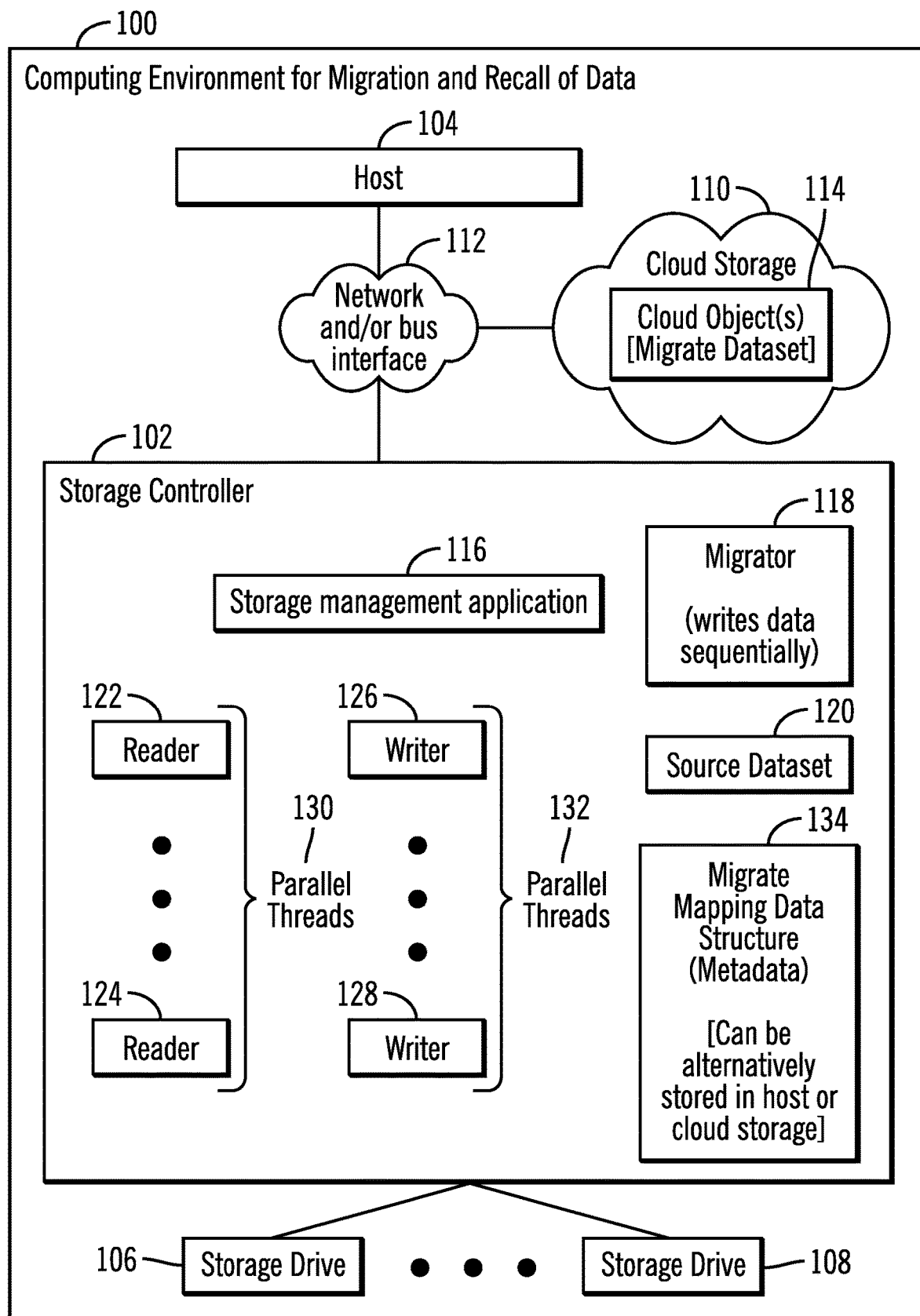
FIG. 1 illustrates a block diagram of a computing environment comprising a storage controller coupled to one or more hosts and one or more storage devices and a cloud storage, where data is migrated to and recalled from the cloud storage, in accordance with certain embodiments.

FIG. 1 illustrates a block diagram of a computing environment 100 comprising a storage controller 102 coupled to one or more hosts 104 and one or more storage drives 106, 108 and a cloud storage 110, where data is migrated to and recalled from the cloud storage 110 by the storage controller 102, in accordance with certain embodiments.

The storage controller 102 allows the one or more hosts 104 to perform input/output (I/O) operations with logical storage maintained by the storage controller 102. The physical storage corresponding to the logical storage with which the storage controller 102 allows the hosts 104 to perform operations may be found in one or more of the storage drives 106, 108 or in the memory of the storage controller 102. In a dual-server configuration of the storage controller 102, the storage controller 102 may be comprised of a first node and a second node, where the first node may also be referred to as a first server, a first Central Electronics Complex (CEC), or a first processor complex, and the second node may be referred to as a second server, a second CEC, or a second processor complex.

In certain embodiments, the storage controller 102, the host 104, and the cloud storage 110 may be coupled via a bus interface [e.g., a point to point optical Peripheral Component Interconnect Express (PCIe) interface] and/or a network interface (as shown via reference numeral 112).

The storage controller 102 and the hosts 104 may comprise any suitable computational device including those presently known in the art, such as, a personal computer, a workstation, a server, a mainframe, a hand held computer, a palm top computer, a telephony device, a network appliance, a blade computer, a processing device, a controller, etc.

The storage controller 102, the hosts 104, the storage drives 106, 108 and the cloud storage 110 may be elements in any suitable network, such as, a storage area network, a wide area network, the Internet, an intranet. In certain embodiments, storage controller 102 and the hosts 104 may be elements in a cloud computing environment that includes the cloud storage 110.

The storage drives 106, 108 may comprise any suitable storage drives known in the art, such as, solid state drives (SSD), hard disk drives (HDD), etc. The cloud storage 110 may be comprised of one of more computational devices and storage devices and may comprise a model of data storage in which digital data is stored as logical objects (e.g. cloud objects 114), and the physical storage corresponding to the cloud objects 114 may span a plurality of computational devices and storage devices.

The storage controller 102 may include a storage management application 116, where in certain embodiments the storage management application 116 may be implemented in software, firmware, hardware or any combination thereof. The storage management application 116 may initiate a migrator 118 which may comprise a process for migrating a source dataset 120 comprising a plurality of tracks to a cloud object comprising a migrate dataset 114 that is stored in the cloud storage 110. The source dataset 120 may be a logical representation of data stored in one or more storage drives 106, 108. The migrator 118 may write tracks sequentially to the migrate dataset 114.

A plurality of threads referred to as readers 122, 124 and writers 126, 128 may be initiated for execution in parallel (shown via reference numerals 130, 132). The readers 122, 124 may execute in parallel to read tracks from the source dataset 120. The writers 126, 128 may execute in parallel to write tracks to the source dataset 120.

A migrate mapping data structure (referred to as metadata) 134 may be maintained in the storage controller 102 or alternatively in the host 104 and/or the cloud storage 110. The metadata 134 stores a mapping of tracks between the source dataset 120 and the cloud object 114 corresponding to the source dataset 120 because tracks may be ordered differently in the source dataset 120 and the corresponding cloud object 114.

Figure 2:
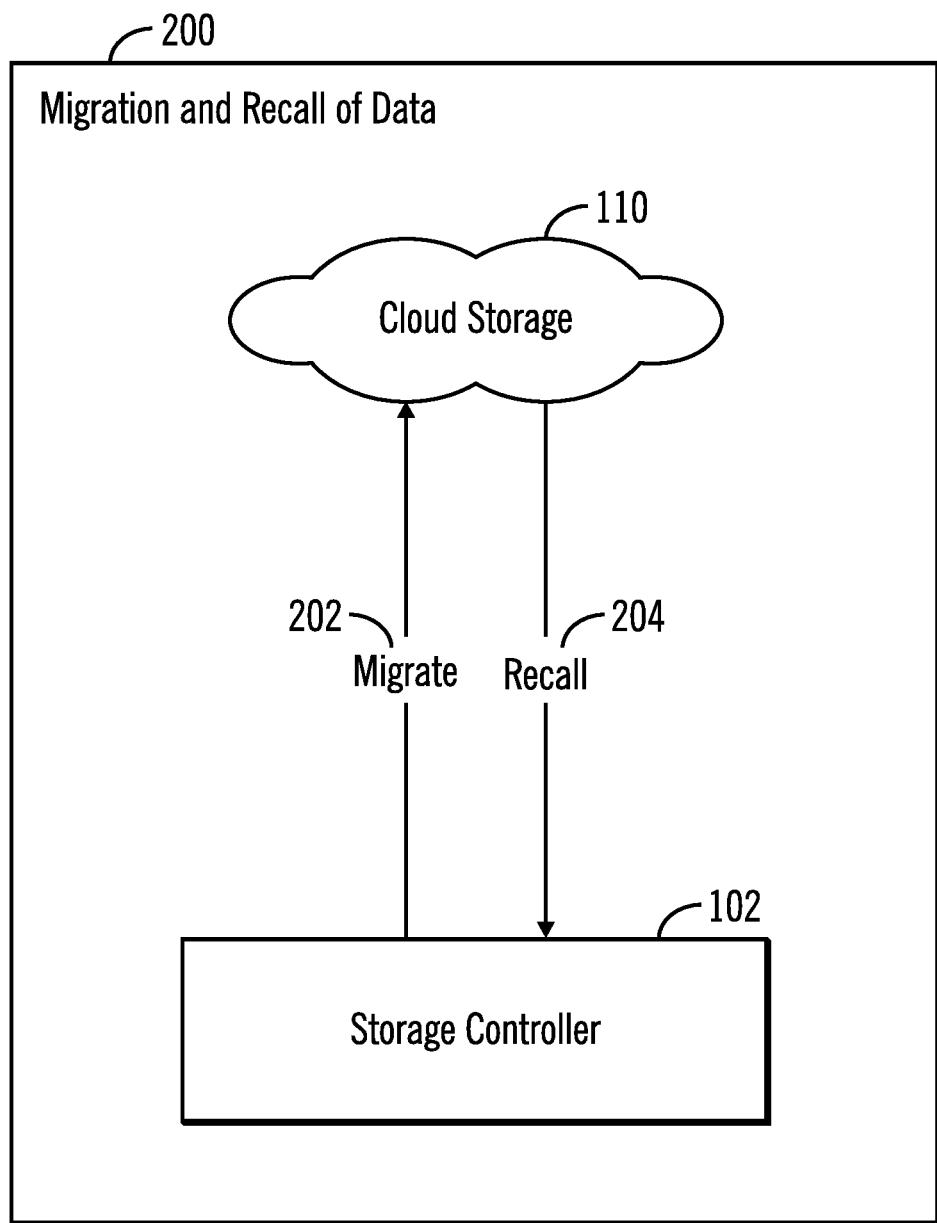
FIG. 2 illustrates a block diagram that shows migration of data to a cloud storage from a storage controller, and recall of the migrated data from the cloud storage to the storage controller, in accordance with certain embodiments.

FIG. 2 illustrates a block diagram 200 that shows migration 202 of data to a cloud storage 110 from a storage controller 102, and recall 204 of the migrated data from the cloud storage 110 to the storage controller 102, in accordance with certain embodiments.

The migration of data may include the reading of data stored in storage drives 106, 108 coupled to the storage controller 102, where the reading is performed in parallel by the readers 122, and the writing of the read data sequentially to the cloud storage 110 by the migrator 118. As a result of the parallel reading by the readers 122, 124 but sequential writing by the migrator 118, the tracks of the data that undergo migration may be in a different order in the cloud storage 110 in comparison to a storage drive 106, 108. Metadata 134 maintains a mapping of tracks of data that is migrated, in order to facilitate the recall 204 of the data from the cloud storage 110 to the storage controller 102.

Figure 3:
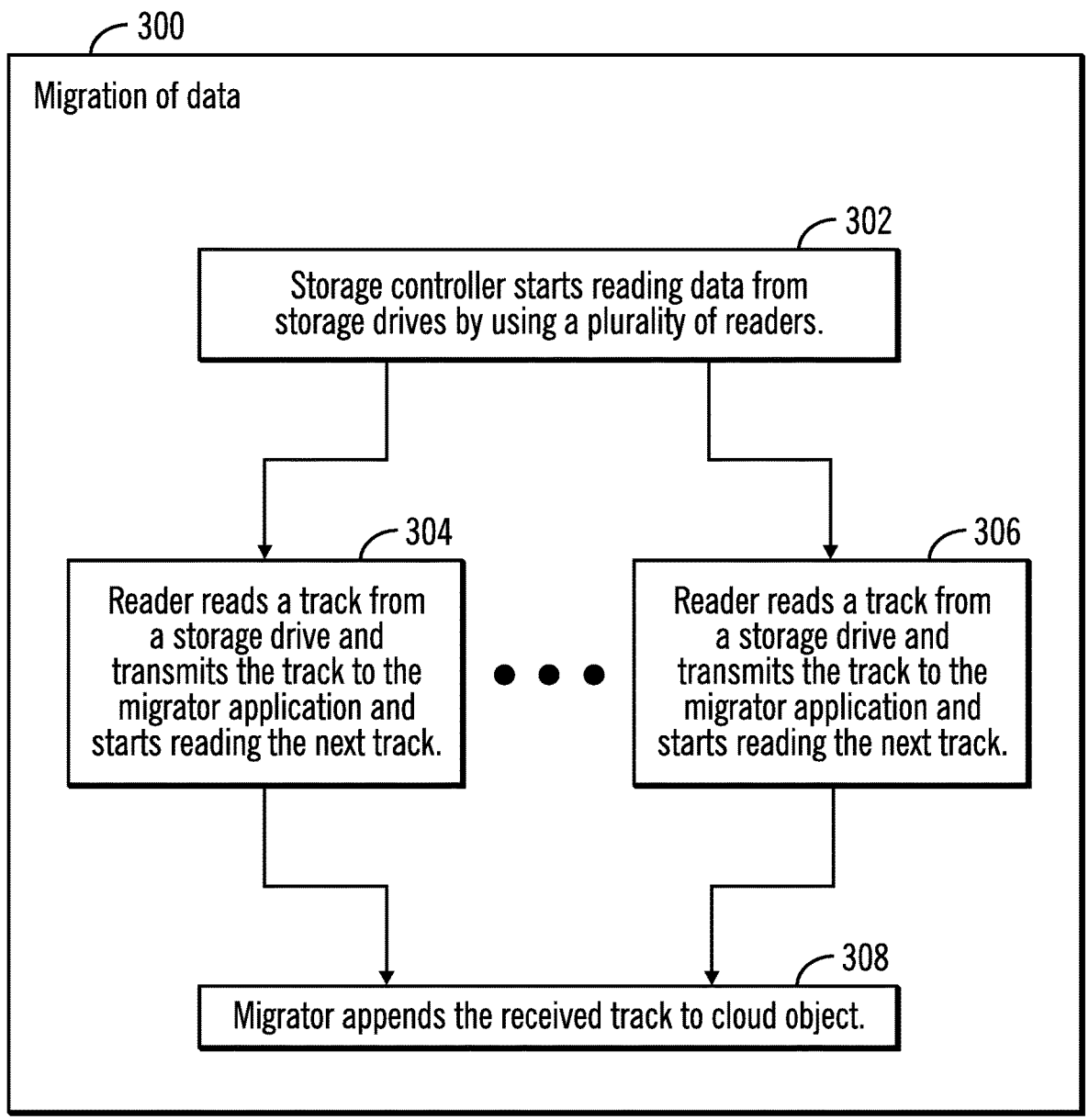
FIG. 3 illustrates a flowchart that shows how the migration of data is performed, in accordance with certain embodiments.

FIG. 3 illustrates a flowchart 300 that shows how the migration of data is performed, in accordance with certain embodiments. The operations shown in FIG. 3 may be performed in the storage controller 102 under the control of the storage management application 116.

Control starts at block 302 in which the storage controller 102 starts reading data from storage drives 106, 108 by using a plurality of readers 122, 124 that are threads executing in parallel. Each reader reads a track from a storage drive and transmits the track to the migrator 118 and starts reading the next track (as shown via reference numerals 304, 306).

In response to receiving a track from a reader, the migrator 118 appends the track to a cloud object 114. The appending of tracks by the migrator 118 to the cloud object 114 is performed sequentially, but since the tracks have been read in parallel by the readers 122, 124, the order of tracks in the cloud object 114 may not be the same order in which the tracks are stored in the storage drives 106, 108. It should be noted that the source dataset 120 is a logical representation of a dataset stored physically in the storage drives 106, 108 and the source dataset 120 comprises a plurality of tracks in a certain order. When tracks of the source dataset 120 are read by readers 122, 124 in parallel and written sequentially to the cloud object 114 by the migrator 118, the order in which tracks are positioned may differ between the cloud object 114 and the source dataset 120.

Figure 4:
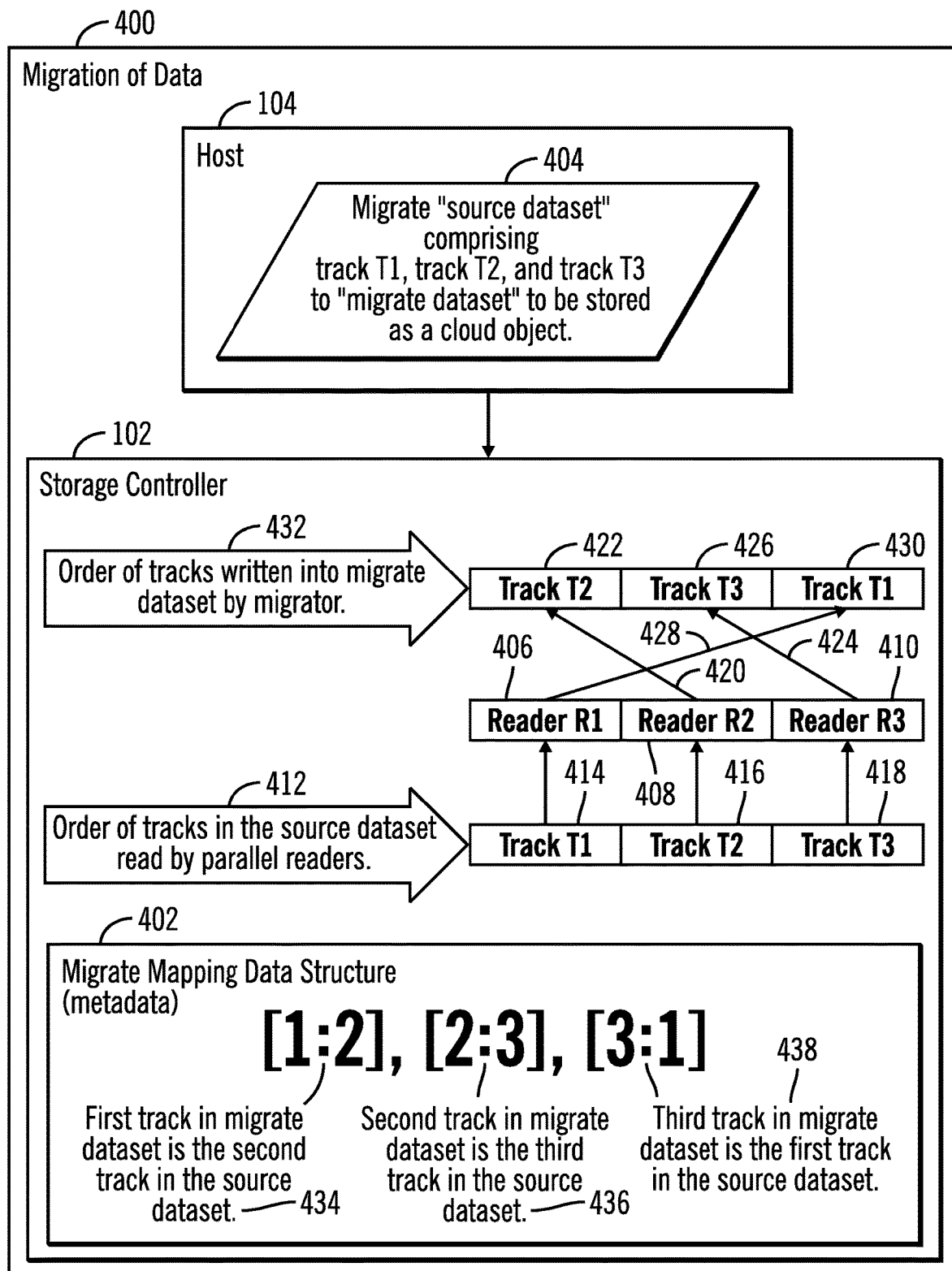
FIG. 4 illustrates a block diagram that shows how the ordering of tracks is changed during the migration of a dataset via a plurality of readers that execute in parallel and how metadata is maintained to restore the ordering of tracks on recall of the dataset, in accordance with certain embodiments.

FIG. 4 illustrates a block diagram 400 that shows how the ordering of tracks is changed during the migration of a source dataset 120 via a plurality of readers 122, 124 that execute in parallel and how metadata 402 is maintained to restore the ordering of tracks on recall of the dataset, in accordance with certain embodiments.

The host 104 sends a command 404 to the storage controller 102, where the command 404 is to migrate a source dataset comprising a track T1, a track T2, and a track T3 to a migrate dataset that is to be stored as a cloud object in the cloud storage 110.

The order of tracks in the source dataset that is read by parallel readers R1, R2, R3 (readers shown via reference numerals 406, 408, 410) is shown via reference numeral 412. The readers R1 406, R2 408, R3 410 execute in parallel and reader R1 406 reads track T1 414, reader R2 408 reads track T2 416, and reader R3 410 reads track T3 418. However, reader R2 408 completes reading of Track T2 416 first and transmits track T2 to the migrator 118, and the migrator 118 writes track T2 to the migrate dataset 114 first (as shown via reference numerals 420, 422). Then, reader R3 410 completes reading of Track T3 418 and transmits track T3 to the migrator 118 and the migrator 118 writes track T3 to the migrate dataset 114 next (as shown via reference numerals 424, 426). Subsequently, reader R1 406 completes reading of Track T1 414 and transmits track T1 to the migrator 118 and the migrator 118 writes track T1 to the migrate dataset 114 next (as shown via reference numerals 428, 430), Thus the order of tracks written to the migrate dataset 114 by the migrator 118 (as shown via reference numeral 432) which is "track T2, track T3, track T1" differs from the order of tracks in the source dataset which is "track T1, track T2, track T3".

In order to facilitate the recall of data from the cloud storage 110 to the storage controller 102 for storing the data on the storage drives 106, 108, the migrate mapping data structure 402 (referred to as metadata) is populated as shown via reference numerals 434, 436, 438, in which the notation [X:Y] (where X and Y are natural numbers) indicates that the track in the $X^{th}$ position in the migrate dataset is the same as the track in the $Y^{th}$ position in the source dataset. For example reference numeral 434 denoting [1:2] indicates that the first track in migrate dataset is the second track in the source dataset, reference numeral 436 denoting [2:3] indicates that the second track in migrate dataset is the third track in the source dataset, and reference numeral 438 indicates that the third track in migrate dataset is the first track in the source dataset.

The metadata 402 may be stored in the storage controller 102, the cloud storage 110, and/or the host 104. During recall from the cloud storage 110, the metadata 402 is used to recover the ordering of the source dataset from the migrated dataset.

Figure 5:
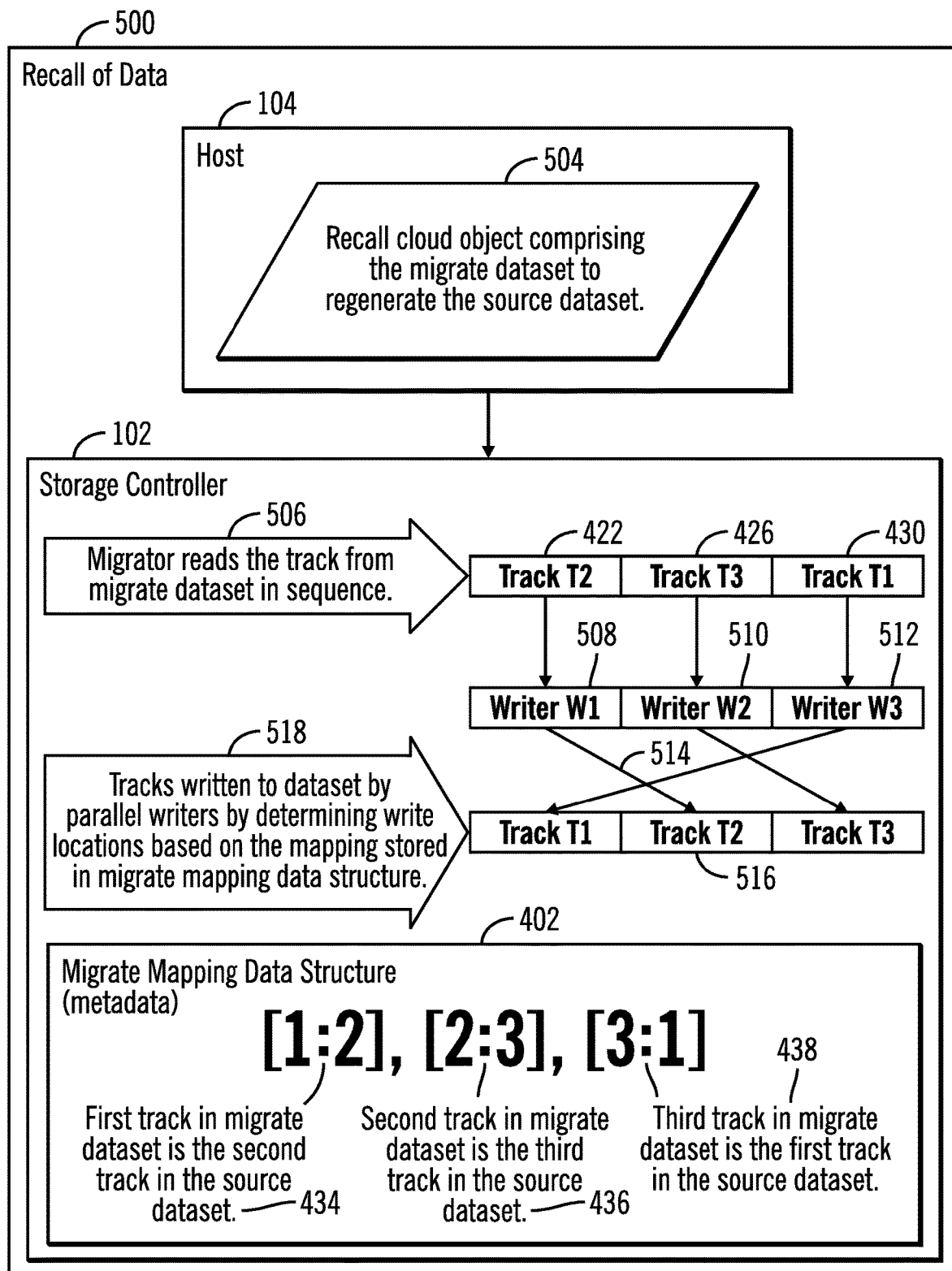
FIG. 5 illustrates a block diagram that shows how the metadata is used to restore the ordering of tracks by a plurality of writers that execute in parallel during a process to recall the dataset from the cloud storage to the storage controller, in accordance with certain embodiments.

FIG. 5 illustrates a block diagram 500 that shows how the metadata 402 is used to restore the ordering of tracks by a plurality of writers 126, 128 that execute in parallel during a process to recall the dataset from the cloud storage 110 to the storage controller 102, in accordance with certain embodiments.

The host 104 sends a command 504 to the storage controller 102, where the command 504 is to recall a cloud object comprising the migrate dataset to regenerate the source dataset.

The migrator 118 reads tracks from the migrate dataset in sequence (as shown via reference numeral 506) and the tracks are transmitted to writers W1, W2, W3 (reference numerals 508, 510, 512) that execute in parallel. The writers write the tracks by parallel writes by determining write locations based on the mapping stored in the metadata 402. For example, writer W1 508 receives track T2 422 from the migrator 118 and writes track T2 to the second position of the source dataset based on the indication provided in the metadata 402 via reference numeral 434 which indicates via the notation [1:2] that the first track in the migrate dataset is the second track in the source dataset (as shown via reference numerals 514, 516). Thus at the conclusion of the operations of writers W1, 508, W2 510, W3 512, the source dataset that is generated from the migrate dataset stored in the cloud storage 114 has the same positional ordering of tracks as the original positional ordering of tracks prior to migration of the source dataset to the migrate dataset (as shown via reference numeral 518).

Figure 6:
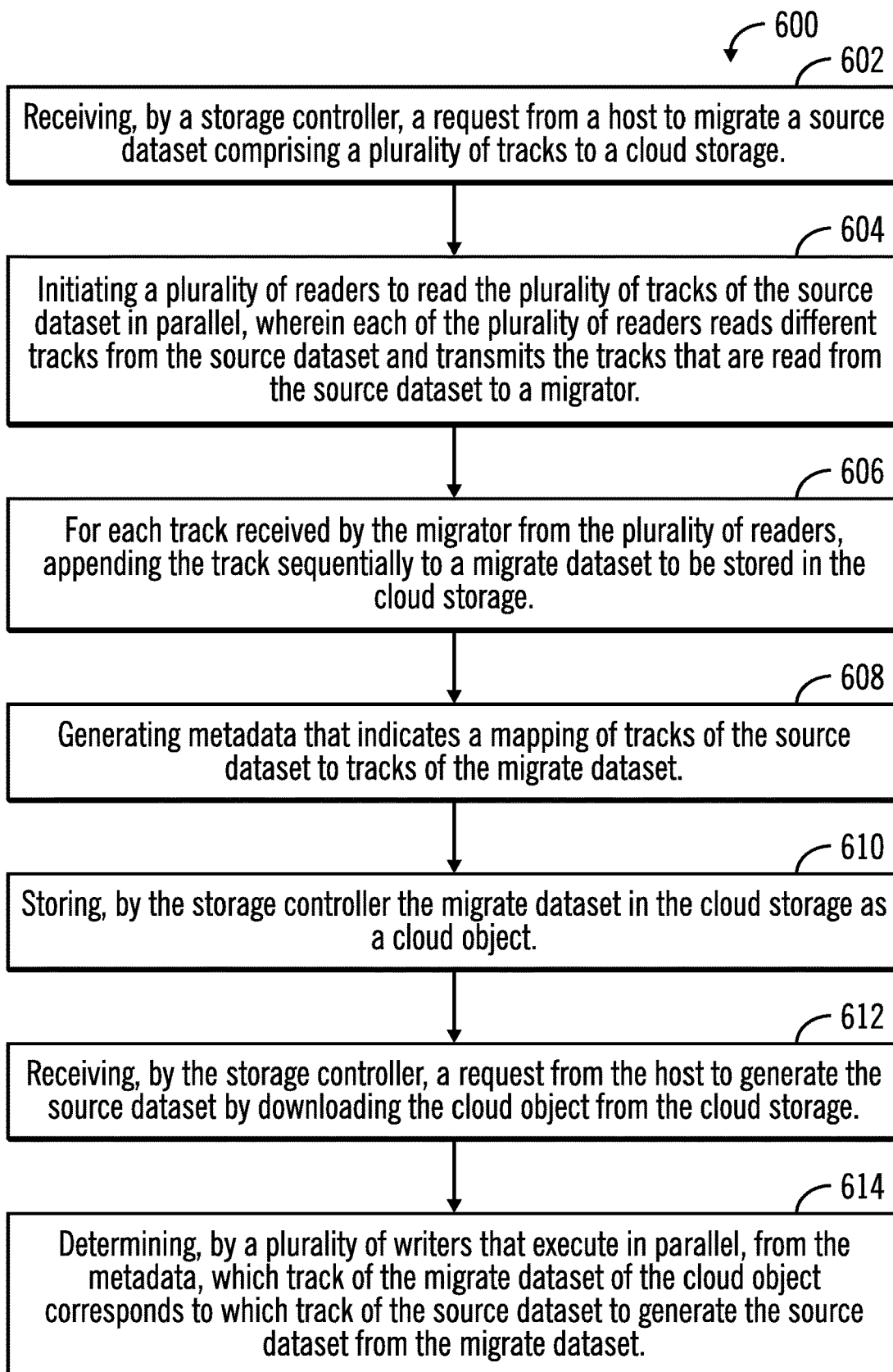
FIG. 6 illustrates a flowchart that shows the migration of data from a storage controller to cloud storage by using parallel readers for the data, in accordance with certain embodiments.

FIG. 6 illustrates a flowchart 600 that shows the migration of data from a storage controller to cloud storage by using parallel readers for the data, in accordance with certain embodiments. The operations shown in FIG. 5 may be performed in the storage controller 102 under the control of the storage management application 116.

Control starts at block 602 in which a storage controller 102 receives a request from a host 104 to migrate a source dataset 120 comprising a plurality of tracks to a cloud storage 110. A plurality of readers 122, 124 are initiated (at block 604) to read the plurality of tracks of the source dataset 120 in parallel, wherein each of the plurality of readers reads different tracks from the source dataset 120 and transmits the tracks that are read from the source dataset 120 to a migrator 118.

From block 604 control proceeds to block 606 in which for each track received by the migrator 118 from the plurality of readers 122, 124, the track is appended sequentially to a migrate dataset 114 to be stored in the cloud storage 110. Metadata 134 that indicates a mapping of tracks of the source dataset 120 to tracks of the migrate dataset 114 is generated (at block 608). The storage controller 102 stores (at block 610) the migrate dataset in the cloud storage 110 as a cloud object.

Subsequently at block 612, the storage controller 102 receives a request from the host 104 to generate the source dataset by downloading the cloud object from the cloud storage 110. A determination is made (at block 614) by a plurality of writers 126, 128 that execute in parallel, from the metadata 134, which track of the migrate dataset of the cloud object corresponds to which track of the source dataset to generate the source dataset from the migrate dataset 114.

Figure 7:
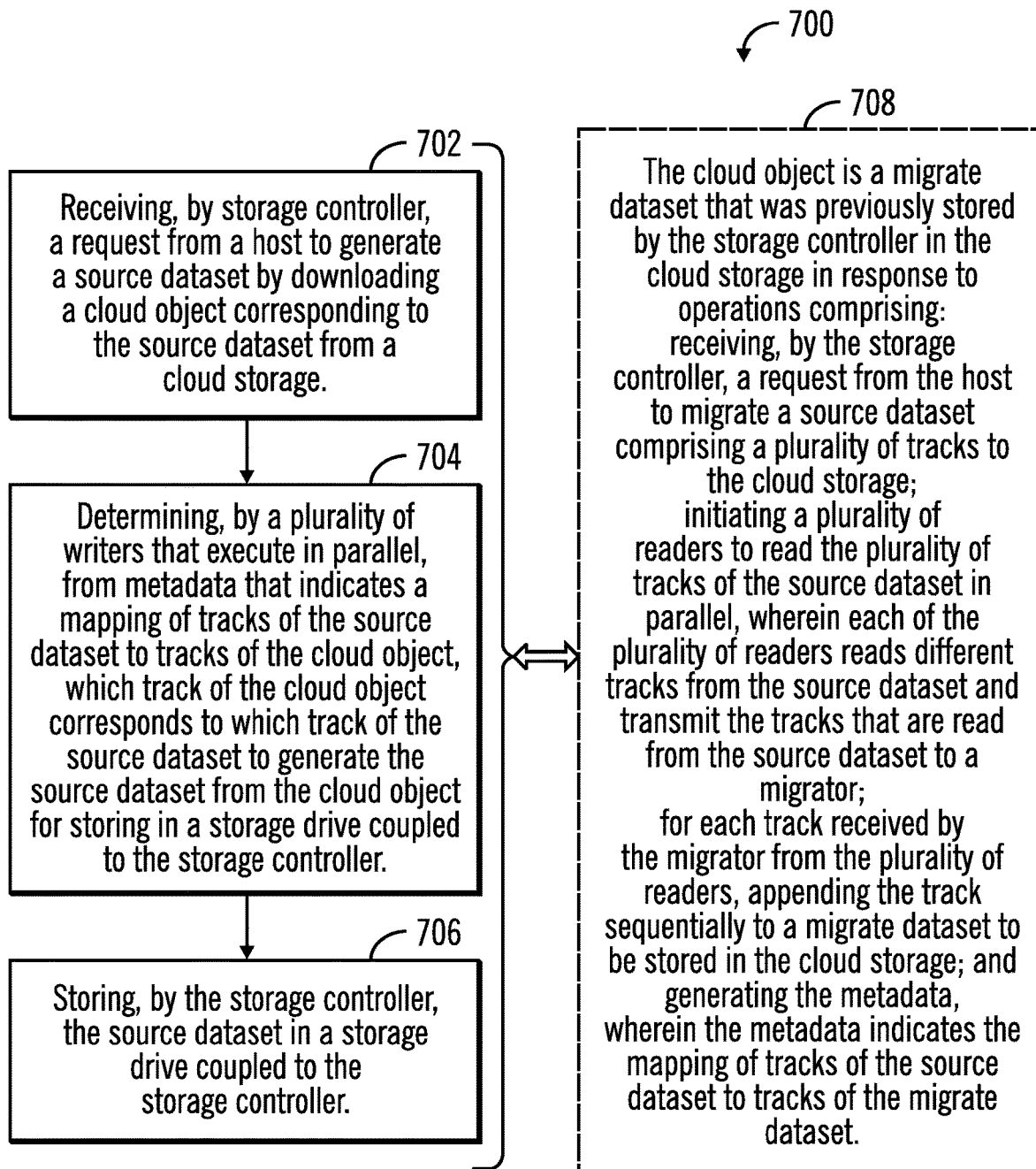
FIG. 7 illustrates a flowchart that shows the recall of previously migrated data from a cloud storage to a storage controller by using parallel writers for the data, in accordance with certain embodiments.

FIG. 7 illustrates a flowchart 700 that shows the recall of previously migrated data from a cloud storage 110 to a storage controller 102 by using parallel writers 126, 128 for the data, in accordance with certain embodiments. The operations shown in FIG. 7 may be performed in the storage controller 102 under the control of the storage management application 116.

Control starts at block 702 in which a storage controller 102 receives a request from a host 104 to generate a source dataset 120 by downloading a cloud object 114 corresponding to the source dataset 120 from a cloud storage 110. A determination is made (at block 704) by a plurality of writers 126, 128 that execute in parallel, from metadata 134 that indicates a mapping of tracks of the source dataset 120 to tracks of the cloud object 114, which track of the cloud object 114 corresponds to which track of the source dataset 120 to generate the source dataset 120 from the cloud object 114 for storing in a storage drive 106, 108 coupled to the storage controller 102. From block 704 control proceeds to block 706 in which the storage controller 102 stores the source dataset 120 in a storage drive 106, 108 coupled to the storage controller 102.

It should be noted that the cloud object referred to in block 702 is a migrate dataset that was previously stored by the storage controller 102 in the cloud storage 110 in response to operations comprising (shown via reference numeral 708): receiving, by the storage controller 102, a request from the host 104 to migrate a source dataset comprising a plurality of tracks to the cloud storage 110; initiating a plurality of readers 122, 124 to read the plurality of tracks of the source dataset in parallel, wherein each of the plurality of readers reads different tracks from the source dataset and transmit the tracks that are read from the source dataset to a migrator 118; for each track received by the migrator 118 from the plurality of readers 122, 124 appending the track sequentially to a migrate dataset to be stored in the cloud storage 110; and generating the metadata 134, wherein the metadata 134 indicates the mapping of tracks of the source dataset to tracks of the migrate dataset.

Therefore, FIGS. 1-7 illustrate certain embodiments where parallel readers and writers are used to increase the processing speed at which data is migrated to and from a cloud storage to a storage controller, while at the same time preserving the ordering of tracks by maintaining metadata that indicates track correspondence between source datasets in the storage controller 102 and migrate datasets in the cloud storage 110. In certain embodiments, based on the real-time workload, the storage controller 102 may control how many parallel reader/writer threads to use for the migrate and recall processes. If higher priority operations are pending, then the migrate and recall processes may be slowed down by using fewer reader/writer threads, to free up more resource for the higher priority operations.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
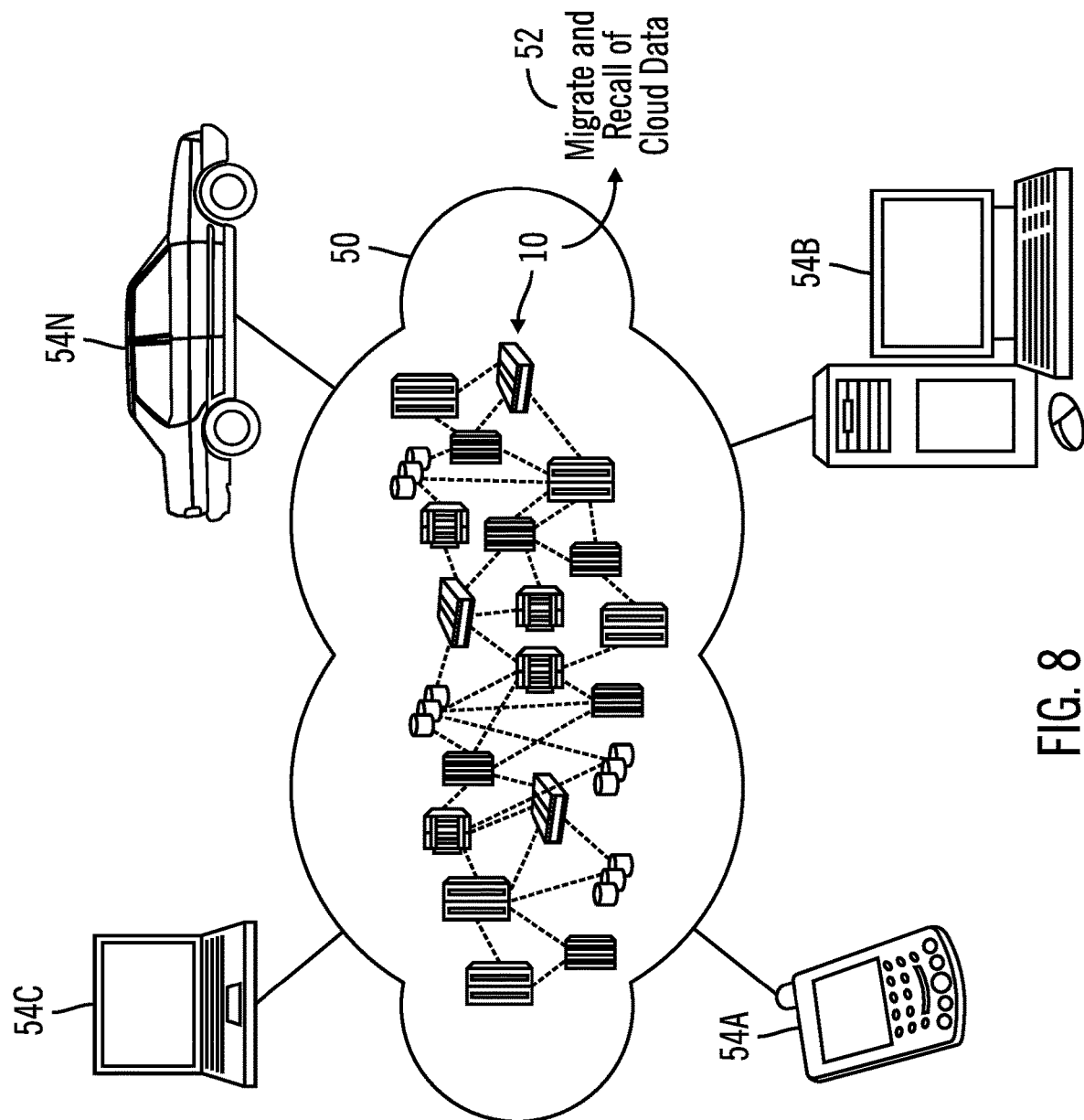
FIG. 8 illustrates a block diagram of a cloud computing environment, in accordance with certain embodiments.

Referring now to FIG. 8 an illustrative cloud computing environment 50 is depicted. Migrate and recall of cloud data (shown via reference numeral 52) is performed in the cloud computing environment 50. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
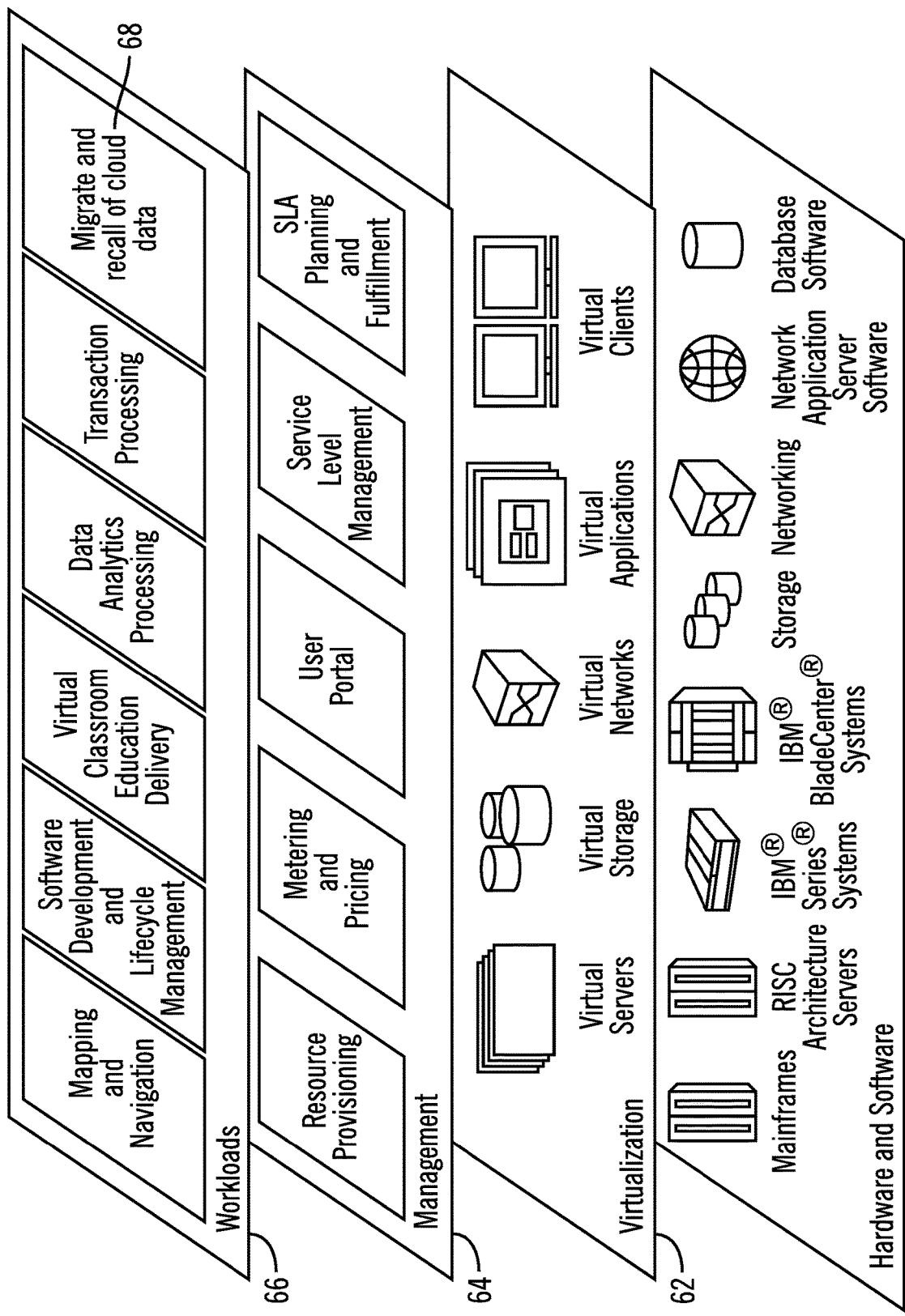
FIG. 9 illustrates a block diagram of further details of the cloud computing environment of FIG. 9 in accordance with certain embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPEEERE* application server software; and database software, in one example IBM DB2* database software.

* IBM, ZSERIES, PSERIES, XSERIES, BLADECENTER, WEBSPHERE, DB2 are trademarks or registered trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and migrate and recall of cloud data 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
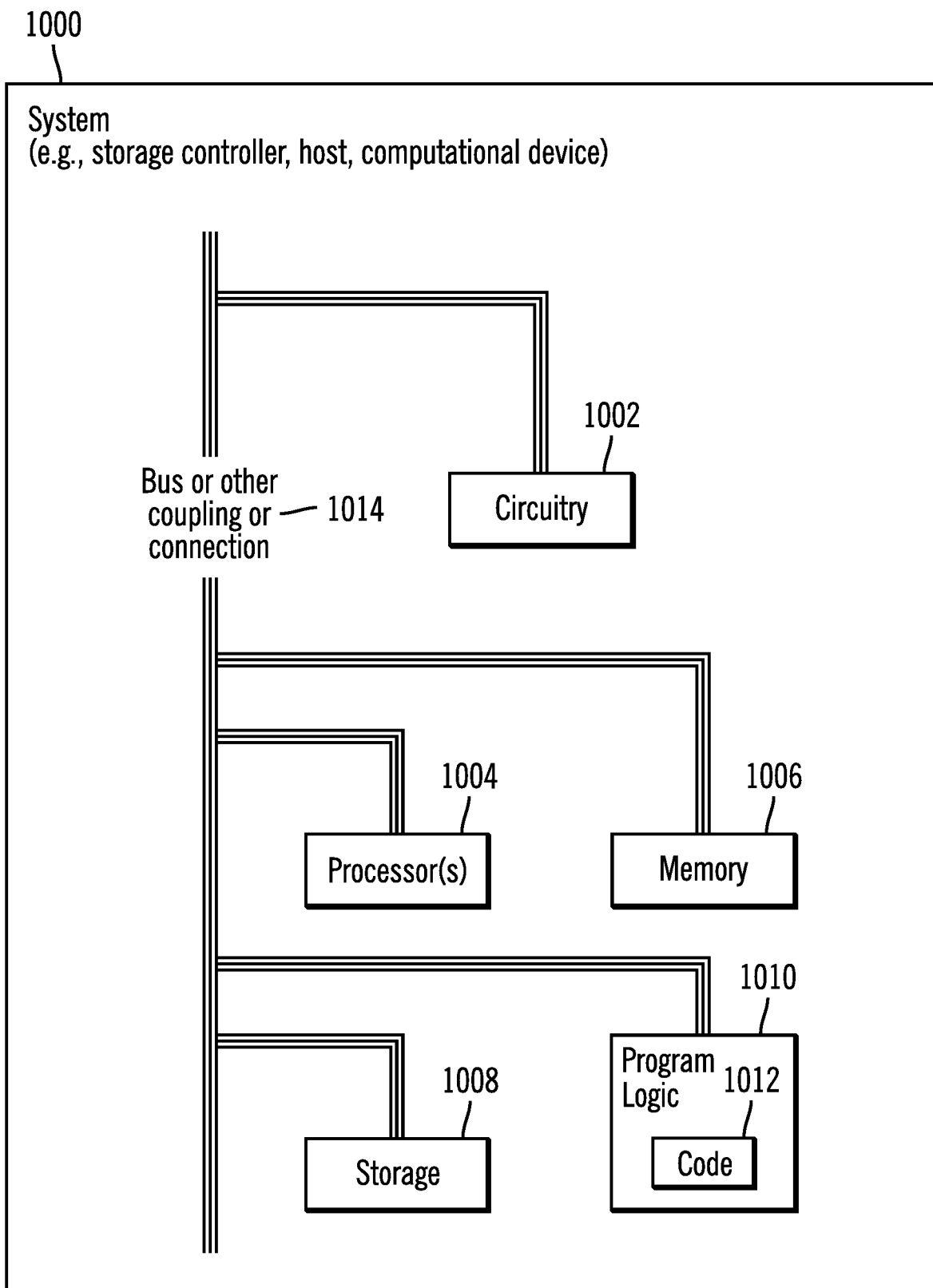
FIG. 10 illustrates a block diagram of a computational system that shows certain elements that may be included in the storage controllers or the host, as described in FIGS. 1-9, in accordance with certain embodiments.

FIG. 10 illustrates a block diagram that shows certain elements that may be included in the storage controller 102, the hosts 104, or computational devices in the cloud storage 110, in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. While FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

receiving, by a storage controller, a request from a host to migrate a source dataset comprising a plurality of tracks to a cloud storage;

initiating a plurality of readers to read the plurality of tracks of the source dataset in parallel, wherein each of the plurality of readers reads different tracks from the source dataset and transmits the tracks that are read from the source dataset to a migrator;

for each track received by the migrator from the plurality of readers, appending the track sequentially to a migrate dataset to be stored in the cloud storage, wherein an order of the plurality of tracks in the source dataset differs from the order of the plurality of tracks in the migrate dataset, in response to a first reader of the plurality of readers completing a reading of a first track of the source dataset subsequent to the reading of a second track of the source dataset by a second reader of the plurality of readers, and a third reader of the plurality of readers completing a reading of a third track of the source dataset subsequent to the reading of the second track of the source dataset by the second reader but prior to the reading of the first track by the first reader, and wherein the second track of the source dataset is located sequentially after the first track of the source dataset in the source dataset, and the third track of the source dataset is located sequentially after the second track of the source dataset in the source dataset; and generating metadata that indicates a mapping of tracks of the source dataset to tracks of the migrate dataset, wherein the mapping of tracks indicates which track of the source dataset corresponds to which track of the migrate dataset, wherein the metadata indicates that a first track in the migrate dataset corresponds to the second track in the source dataset, and a second track in the migrate dataset corresponds to the third track in the source dataset, and a third track of the migrate dataset corresponds to the first track of the source dataset, and wherein the first track of the migrate dataset is located sequentially before the second track of the migrate dataset, and the second track of the migrate dataset is located sequentially before the third track of the migrate dataset.

2. The method of claim 1, the method further comprising:
storing, by the storage controller the migrate dataset in the cloud storage as a cloud object.

3. The method of claim 2, the method further comprising:
receiving, by the storage controller, a request from the host to generate the source dataset by downloading the cloud object from the cloud storage; and
determining, by a plurality of writers that execute in parallel, from the metadata, which track of the migrate dataset of the cloud object corresponds to which track of the source dataset to generate the source dataset from the migrate dataset.

4. The method of claim 3, the method further comprising:
in response to determining that operations with a higher priority than the request are pending, decreasing a speed at which the migrate is performed, by reducing a number of the plurality of readers that execute in parallel, wherein resources are freed up for the operations with the higher priority than the request by reducing the number of the plurality of readers that execute in parallel.

5. The method of claim 1, wherein the metadata indicates for each track of the migrate dataset a corresponding track of the source dataset.

6. The method of claim 1, wherein the plurality of readers that read the tracks of the source dataset in parallel increases a speed of reading from storage drives in comparison to reading all tracks of the source dataset sequentially by a single reader.

7. The method of claim 1, wherein the migrate dataset is stored as a single object in the cloud storage.

8. A system, comprising:
a memory; and
a processor coupled to the memory, wherein the processor performs operations, the operations comprising:
receiving a request from a host to migrate a source dataset comprising a plurality of tracks to a cloud storage;
initiating a plurality of readers to read the plurality of tracks of the source dataset in parallel, wherein each of the plurality of readers reads different tracks from the source dataset and transmits the tracks that are read from the source dataset to a migrator;
for each track received by the migrator from the plurality of readers, appending the track sequentially to a migrate dataset to be stored in the cloud storage, wherein an order of the plurality of tracks in the source dataset differs from the order of the plurality of tracks in the migrate dataset, in response to a first reader of the plurality of readers completing a reading of a first track of the source dataset subsequent to the reading of a second track of the source dataset by a second reader of the plurality of readers, and a third reader of the plurality of readers completing a reading of a third track of the source dataset subsequent to the reading of the second track of the source dataset by the second reader but prior to the reading of the first track by the first reader, and wherein the second track of the source dataset is located sequentially after the first track of the source dataset in the source dataset, and the third track of the source dataset is located sequentially after the second track of the source dataset in the source dataset; and
generating metadata that indicates a mapping of tracks of the source dataset to tracks of the migrate dataset, wherein the mapping of tracks indicates which track of the source dataset corresponds to which track of the migrate dataset, wherein the metadata indicates that a first track in the migrate dataset corresponds to the second track in the source dataset, and a second track in the migrate dataset corresponds to the third track in the source dataset, and a third track of the migrate dataset corresponds to the first track of the source dataset, and wherein the first track of the migrate dataset is located sequentially before the second track of the migrate dataset, and the second track of the migrate dataset is located sequentially before the third track of the migrate dataset.

9. The system of claim 8, the operations further comprising:
storing the migrate dataset in the cloud storage as a cloud object.

10. The system of claim 9, the operations further comprising:
receiving a request from the host to generate the source dataset by downloading the cloud object from the cloud storage; and
determining, by a plurality of writers that execute in parallel, from the metadata, which track of the migrate dataset of the cloud object corresponds to which track of the source dataset to generate the source dataset from the migrate dataset.

11. The system of claim 10, the operations further comprising:
in response to determining that operations with a higher priority than the request are pending, decreasing a speed at which the migrate is performed, by reducing a number of the plurality of readers that execute in parallel, wherein resources are freed up for the operations with the higher priority than the request by reducing the number of the plurality of readers that execute in parallel.

12. The system of claim 8, wherein the metadata indicates for each track of the migrate dataset a corresponding track of the source dataset.

13. The system of claim 8, wherein the plurality of readers that read the tracks of the source dataset in parallel increases a speed of reading from storage drives in comparison to reading all tracks of the source dataset sequentially by a single reader.

14. The system of claim 8, wherein the migrate dataset is stored as a single object in the cloud storage.

15. A computer program product, the computer program product comprising a computer readable storage medium having computer readable program code embodied therewith, the computer readable program code configured to perform operations, the operations comprising:
receiving, by a storage controller, a request from a host to migrate a source dataset comprising a plurality of tracks to a cloud storage;
initiating a plurality of readers to read the plurality of tracks of the source dataset in parallel, wherein each of the plurality of readers reads different tracks from the source dataset and transmits the tracks that are read from the source dataset to a migrator;

for each track received by the migrator from the plurality of readers, appending the track sequentially to a migrate dataset to be stored in the cloud storage, wherein an order of the plurality of tracks in the source dataset differs from the order of the plurality of tracks in the migrate dataset, in response to a first reader of the plurality of readers completing a reading of a first track of the source dataset subsequent to the reading of a second track of the source dataset by a second reader of the plurality of readers, and a third reader of the plurality of readers completing a reading of a third track of the source dataset subsequent to the reading of the second track of the source dataset by the second reader but prior to the reading of the first track by the first reader, and wherein the second track of the source dataset is located sequentially after the first track of the source dataset in the source dataset, and the third track of the source dataset is located sequentially after the second track of the source dataset in the source dataset; and generating metadata that indicates a mapping of tracks of the source dataset to tracks of the migrate dataset, wherein the mapping of tracks indicates which track of the source dataset corresponds to which track of the migrate dataset, wherein the metadata indicates that a first track in the migrate dataset corresponds to the second track in the source dataset, and a second track in the migrate dataset corresponds to the third track in the source dataset, and a third track of the migrate dataset corresponds to the first track of the source dataset, and wherein the first track of the migrate dataset is located sequentially before the second track of the migrate dataset, and the second track of the migrate dataset is located sequentially before the third track of the migrate dataset.

16. The computer program product of claim 15, the operations further comprising:

storing, by the storage controller the migrate dataset in the cloud storage as a cloud object.

17. The computer program product of claim 16, the operations further comprising:

receiving, by the storage controller, a request from the host to generate the source dataset by downloading the cloud object from the cloud storage; and determining, by a plurality of writers that execute in parallel, from the metadata, which track of the migrate dataset of the cloud object corresponds to which track of the source dataset to generate the source dataset from the migrate dataset.

18. The computer program product of claim 17, the operations further comprising:

in response to determining that operations with a higher priority than the request are pending, decreasing a speed at which the migrate is performed, by reducing a number of the plurality of readers that execute in parallel, wherein resources are freed up for the operations with the higher priority than the request by reducing the number of the plurality of readers that execute in parallel.

19. The computer program product of claim 15, wherein the metadata indicates for each track of the migrate dataset a corresponding track of the source dataset.

20. The computer program product of claim 15, wherein the plurality of readers that read the tracks of the source dataset in parallel increases a speed of reading from storage drives in comparison to reading all tracks of the source dataset sequentially by a single reader.

* * * * *